United States Patent
Schut et al.

(10) Patent No.: US 8,543,254 B1
(45) Date of Patent: Sep. 24, 2013

(54) VEHICULAR IMAGING SYSTEM AND METHOD FOR DETERMINING ROADWAY WIDTH

(75) Inventors: Jeremy A. Schut, Grand Rapids, MI (US); David M. Falb, Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 13/432,250

(22) Filed: Mar. 28, 2012

(51) Int. Cl.
*G05D 1/00* (2006.01)
*B60T 7/12* (2006.01)
*G06K 9/00* (2006.01)
*H04N 7/18* (2006.01)

(52) U.S. Cl.
USPC ............... 701/1; 701/96; 382/106; 348/135

(58) Field of Classification Search
USPC .... 701/1, 96, 117, 300, 301, 302; 340/425.5, 340/435, 436, 438, 437; 348/135, 142, 137, 348/138, 140, 148; 382/103, 104, 106, 107; 356/139.01
See application file for complete search history.

(56) References Cited

U.S. PATENT DOCUMENTS

| | | | |
|---|---|---|---|
| 6,249,214 B1 * | 6/2001 | Kashiwazaki | 340/425.5 |
| 7,565,006 B2 * | 7/2009 | Stam et al. | 382/155 |
| 7,881,839 B2 | 2/2011 | Stam et al. | |
| 8,120,652 B2 | 2/2012 | Bechtel et al. | |
| 2004/0240710 A1 * | 12/2004 | Lages et al. | 382/104 |
| 2005/0200467 A1 | 9/2005 | Au et al. | |
| 2006/0095195 A1 * | 5/2006 | Nishimura et al. | 701/96 |
| 2006/0106518 A1 * | 5/2006 | Stam et al. | 701/49 |
| 2007/0290886 A1 | 12/2007 | Stam et al. | |
| 2008/0186154 A1 | 8/2008 | Bosch | |
| 2010/0208244 A1 * | 8/2010 | Earhart et al. | 356/139.01 |
| 2012/0062743 A1 * | 3/2012 | Lynam et al. | 348/148 |
| 2012/0072080 A1 | 3/2012 | Jeromin et al. | |

OTHER PUBLICATIONS

U.S. Appl. No. 13/343,952, filed Jan. 5, 2012, to David J. Wright et al.
U.S. Appl. No. 13/402,701, filed Feb. 22, 2012, to Robert Steel et al.
U.S. Appl. No. 13/405,697, filed Feb. 27, 2012, to Mark R. Roth et al.

* cited by examiner

*Primary Examiner* — Muhammad Shafi
(74) *Attorney, Agent, or Firm* — Price Heneveld LLP; Scott P. Ryan

(57) ABSTRACT

A vehicular imaging system for determining roadway width includes an image sensor for capturing images and an image processor for receiving the captured images. The image processor determines roadway width by identifying roadway marker signs and oncoming traffic in processed images captured by the image sensor and determining the number of lanes, vehicle location on the roadway based on the roadway size and/or width and location of oncoming traffic.

13 Claims, 3 Drawing Sheets

VEHICULAR IMAGING SYSTEM AND METHOD FOR DETERMINING ROADWAY WIDTH

FIELD OF THE INVENTION

The present invention relates generally to vehicular imaging systems and more particularly to an imaging system used in a vehicular environment for determining roadway width and traffic positioning.

BACKGROUND OF THE INVENTION

Different types of optical devices and systems have been used for many years to detect roadway lanes, signs, and images in front of the vehicle. One type of optical based driver assist system is a vehicle headlight assist system that uses optical imaging to control headlight position and intensity. Systems like optical based vehicle headlight control all work to assist the driver in safer vehicle operation.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
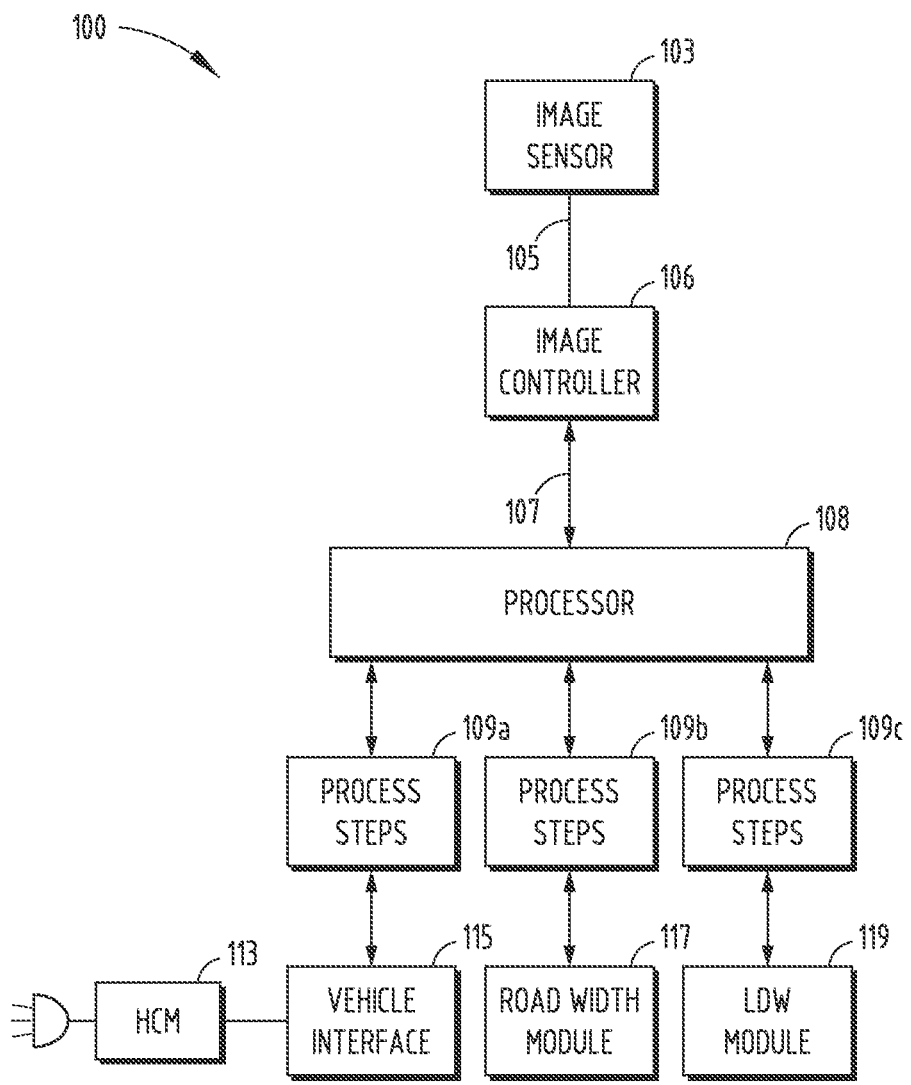
FIG. 1 is a block diagram illustrating a system used for determining roadway width in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

SUMMARY OF THE INVENTION

Embodiments of the present invention are directed to a vehicular imaging system for determining roadway width that include an image sensor configured for capturing images. An image processor is configured for receiving captured images and is configured to determine roadway size and/or width by identifying roadway marker signs in processed images that are captured by the image sensor. In another embodiment of the invention, an optical imagining system is used for identifying the size and/or width of a vehicular roadway and includes at least one imaging processor configured to receive images captured from at least one imager for identifying roadway edge signs in the captured images such that at least one processor is configured to determine a distance from a roadway edge sign for identifying the size of the roadway.

DETAILED DESCRIPTION

Before describing in detail embodiments that are in accordance with the present invention, it should be observed that the embodiments reside primarily in combinations of method steps and apparatus components related to a vehicular system for determining roadway size and width.

Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a vehicular system and method for determining roadway type, size and/or width as described herein. The non-processor circuits may include, but are not limited to signal drivers, clock circuits, power source circuits, and user input devices. As such, these functions may be interpreted as steps of a method to determine roadway type, size, and/or width. Alternatively, some or all functions could be implemented by a state machine that has no stored program instructions, or in one or more application specific integrated circuits (ASICs) or field programmable gate array (FPGA), in which each function or some combinations of certain of the functions are implemented as custom logic. Of course, a combination of the two or more approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions, programs and ICs with minimal experimentation.

FIG. 1 is a block diagram showing the vehicle equipment control system in accordance with an embodiment of the invention. The control system 100 includes a dedicated image controller 101 that is provided to control the image sensor 103 via a connection 105 and may also serve to perform pre-processing functions such as image auto-exposure, dynamic range compression, filtering, and/or color computation. The image data is then transmitted over data link 107 to one or more processors 108. The processor 108 is typically a microprocessor configured either discreetly or instantiated using various components using a field programmable gate array (FPGA), or a combination of discrete and FPGA or the like and is configurable and/or adapted to perform a plurality of functions including but not limited to headlamp control and other driver assist features. The processor 108 can request images directly from the image controller 101 rather than controlling the camera 103 directly. The processor 108 can also request specific image data from the image controller 101 or may receive streaming image data on a periodic interval where it is stored in internal buffer. By way of example and not limitation, pixels received by the internal buffer can be stored in a plurality of rows. Once the plurality of rows of data are stored, the data buffer is used to determine colors, light peaks and/or objects within the image while the image data is streamed. Those skilled in the art will recognize that other types of storage techniques can also be used depending on buffer size.

Subsequently, the image data received by the image controller 101 is then used with one or more algorithms in various processing steps 109a, 109b, 109c. Each of the respective processing steps 109a, 109b, 109c are used in connection with the vehicle driver assist functions such as vehicle interface 111, road width module 117, headlamp control system, traffic sign recognition (TSR) and a lane departure warning (LDW) system 119 used for detecting lane position. The vehicle interface 111, e.g. a LIN or CAN bus, is typically used with a headlight control module 113 for controlling functions of vehicle lighting 115. In use, the various processing steps work in combination with a headlight controller to make a recommendation for controlling the vehicle lighting and/or alternatively to process and directly control the vehicle headlights. Those skilled the art will recognize that headlight control can mean the control of headlight intensity, lighting distribution and/or additional lighting features. As described herein, the road width detection module 117 is used for identifying the roadway width. Similarly, the LDW module 119 is used for determining the location of vehicle lane Ines and alerting the driver of a lane departure. This information can also be used in connection with headlight control. Those skilled in the art will also recognize that the image controller 101 may be provided integral with the camera such as an image sensor 103 and/or integrated monolithically on the same silicon chip as an image sensor.

In the embodiments described herein, the image sensor 103 may be located on the mount of a vehicle rear-view mirror or externally on the vehicle. Locating a camera on the mirror mount has several advantages namely, the mount is rigid and stationary, the mirror mount is typically located in the vehicle's windshield wiper path, and the factory installation is simplified as the mirror is already being attached. Examples of such camera mounting and/or positioning can be found in U.S. Pat. No. 8,120,652 as well as U.S. application Ser. Nos. 13/405,697 and 13/402,701 which are commonly assigned to Gentex Corporation and all incorporated by reference herein in their entireties. The camera or imager may be placed separate from the mirror, however, an additional factory installation step may sometimes be necessary. Regardless of the location of image sensor 103, both the image controller 101 and the processor 108 may be co-located with image sensor 103, on the same or separate circuit boards. The processor 108 may also be located in a rear-view mirror body and may serve to perform additional functions such as a compass sensor and/or control of an auto-dimming or transflective rear-view mirror. Similarly, these processors can also be located in a headliner, over-head console, or other suitable location in the vehicle.

Figure 2:
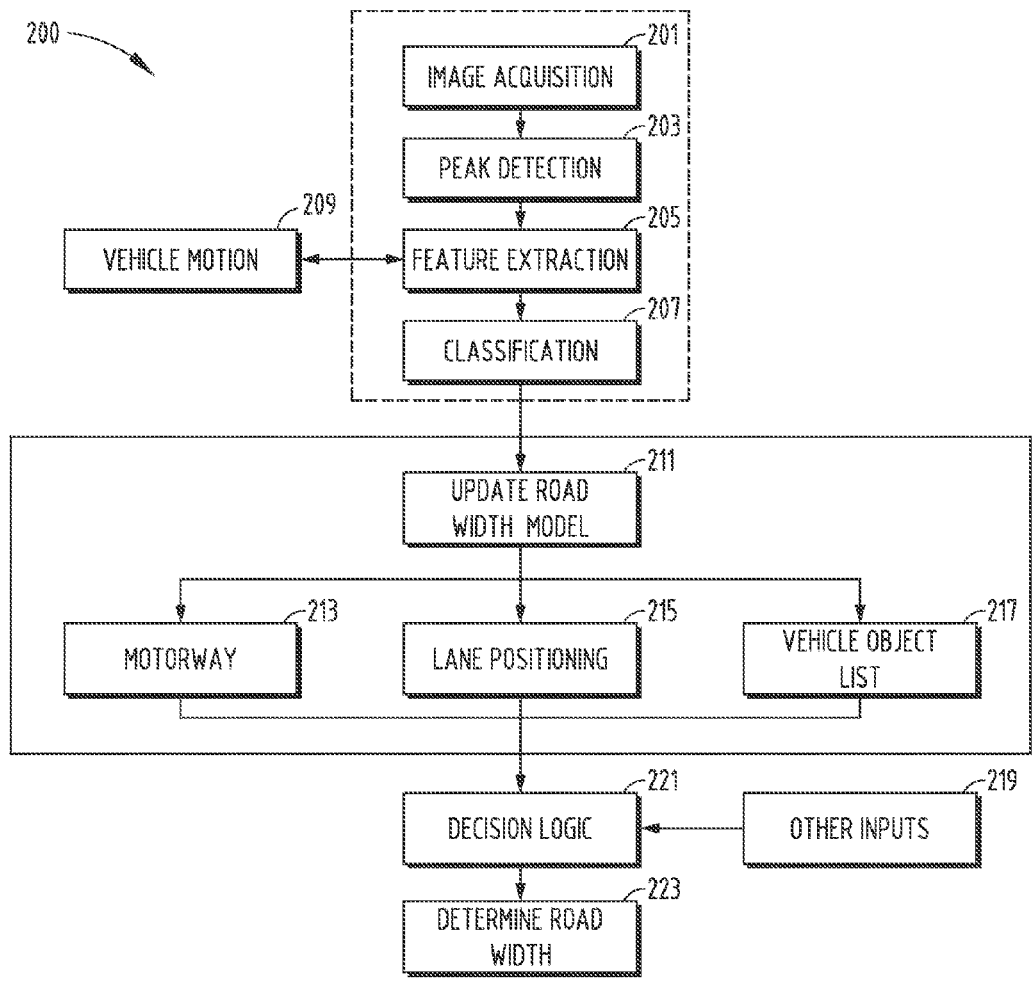
FIG. 2 is a flow chart diagram illustrating the method for determining roadway width according to an embodiment of the present invention.

FIG. 2 is a flow chart diagram illustrating the method for determining roadway size and/or width 200 using the roadway width module according to various embodiments of the present invention. Those skilled in the art will recognize that a roadway's "size" is qualitative while systems and methods for determining roadway "width" are quantitative measurements. As described herein, roadway size refers to how the road is classified (motorway, 2-lane road, multilane road, etc.) while the roadway width would be the feature and/or measurement that is calculated for the road (some qualitative unit of measurement e.g. meters). Using the road width feature as described herein, the road size and/or type can be estimated.

The process begins with image acquisition 201 where the front facing imager or camera on the vehicle acquires a digital image in one or more frames of data. Although the imager is used to produce multiple frames of data, the flow chart as described in FIG. 2, describes the overall process used in connection with a single data frame. Once the image is acquired, it is initially stored in cache or buffer for optical processing. Because of the size of the buffer on the microprocessor, the entire image is not stored but only predetermined portions of it. Thereafter, the image is processed with optical algorithms used in connection with light peak detection 203. In peak detection, the various pixels of light are analyzed and processed to determine light intensity such as local brightness amplitude peaks. These peaks in light amplitude are then used for identifying the "intensity local maxima" portions of a light source or reflective object. These light peaks and the area immediately around them can then be used for identifying a sources' intensity, size, position, type, category and/or identity.

In at least one embodiment of the present invention, road edge reflectors or other signage can be detected by the vehicular control system 100 to calculate road size and/or width. As is known by those skilled in the art, the road lane signs or markers are reflective plastic or metal objects that are typically affixed to a metallic pole or shaft that is 2-4 meters in length. In many cases depending on application, the reflectors are substantially white or yellow in color and can be detected by the vehicular optical camera in twilight or nighttime driving conditions. Thus, the image processing for detecting these reflectors or other signage is disabled in daylight conditions however the system could also be adapted for use in daylight for TSR and/or other driver assist applications. The vehicular optical system in accordance with the invention operates to locate and identify road edge markers which can be located on the left and right road edges. However, in an alternative embodiment, calculation using signage above the roadway can also determine roadway width and/or size. These markers are generally positioned some predetermined distance e.g., 5 or more meters from an edge of the paved surface roadway and may be planted in earth beyond a predetermined distance from a disabled lane or roadway edge. Once detected, the system can determine road width and/or size from various optical parameters within the image. These parameters can be used to first calculate distance from the vehicle's optical system, such as the vehicle's imager, and this data can be used to determine or estimate the overall size and/or width of a highway or roadway. Any information regarding points of intersection of the road or road center can be used for aiming of the vehicle optics used for high beam assist functions and the like. Aiming of the vehicle system is implemented using software aiming pixel selection techniques. Examples of software implemented pixel selection techniques can be found in U.S. patent application Ser. No. 13/274,808 assigned to Gentex Corporation and is hereby incorporated by reference in its entirety. From this information, the system can also determine the typical number of road lanes as well as the vehicle's position on the roadway and/or within a particular lane using defined nominal lane widths. For example such standard road widths maybe be approximately 6 meters in overall width however greater or lesser lane width sizes can also be selected for various calculations.

As driver assist imaging systems become more commercially available on new vehicles, these systems can include software upgrades for use in identifying roadway size and width. For example, since a lane departure warning system could typically be used to identify lane markers e.g. painted reflective road lines or stripes on the roadway, these systems might also be used to identify roadway sign markers at a roadway's outer edges. As noted herein, algorithms can be used in connection with these systems to identify one or more roadway edge markers for the purpose of determining roadway size, width and/or lane position in addition to their normal lane departure warning function. Thus, current driver assist systems may be used and/or modified in combination with other vehicle systems to determine road type, size and width in accordance with embodiment of the present invention. This process involves recognizing pixels that are above some predetermined light feature threshold such that a roadway marker can be identified and classified as compared to headlights, taillights, signs and/or other objects. By way of example and not limitation, these processes are taught in U.S. Pat. Nos. 7,565,006, 7,881,839 and 8,085,760, U.S. Publication No. US 2007/0290886 and U.S. application Ser. No. 13/343,752 which are commonly assigned to Gentex Corporation and are herein incorporated by reference in their entirety.

The method for determining roadway size and/or width further includes the step of feature extraction 205. This process involves identifying important light sources and then processing optical data derived from these light sources to gather additional information about them. This additional information may include but is not limited to the size (e.g. width and height) of the lights in pixels, color ratio (e.g. red vs. green-blue wavelengths) and/or whether it is a sharp light distribution indicating a light source versus a reflective surface. Various parameters of the vehicle such as speed, yaw, roll, steering wheel position and vehicle direction i.e. the vehicle motion 209 can be used in combination with vehicle position to determine the location of the light sources or peaks. The extracted features are then classified into various types 207 which help to identify the various sources of light such as headlight, taillights, streetlights, road signs, road markers or other image reflections. During light peak source detection and subsequent use with driver assist features, the light source classification also takes into account vehicle motion 209 such as vehicle speed and its motion vector or yaw such as straight line or turning in various types of curved roadways.

Figure 3A:
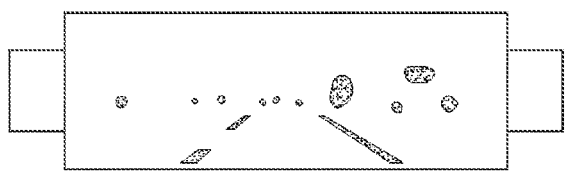
FIG. 3A is a diagram showing detection of raw pixel image data as conveyed by an imager.
Figure 3B:
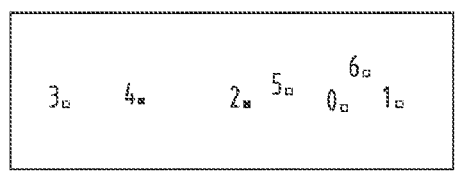
FIG. 3B is a diagram illustrating the use of feature extraction where light peaks are detected and classified.

FIG. 3A and FIG. 3B are diagrams illustrating this process of detection of an image and classification of light peaks according to an embodiment of the invention. More specifically, FIG. 3A illustrates how raw pixel image data is initially identified in the image. In this case, the raw image data may be road signs, road markers or other vehicle lights. The images shown in FIG. 3A, are multiple high dynamic range (HDR) snap shots comprised of different sizes and different exposure lengths to capture a combined HDR image. Alternatively, single frame HDR imaging techniques can also be used. Similarly, FIG. 3B illustrates the use of feature extraction where the light peaks are detected and classified. In this example, each of the light peaks are sequentially numbered so that they can be more easily matched to the list of features that are associated with each light peak. Thus, the light peaks and location of the peak in the image, once the speed and yaw of the vehicle is known from data provided by other sensors communicated on a vehicle bus including but not limited to the CAN-bus or LIN-bus.

Figure 4A:
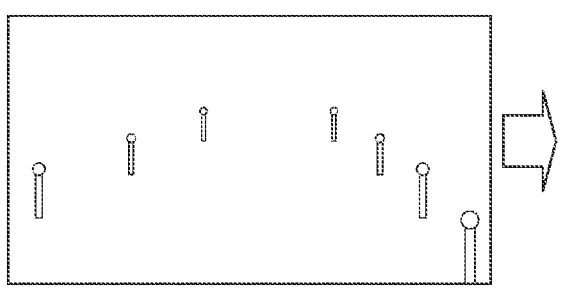
FIG. 4A and FIG. 4B are diagrams showing detection of an image and classification of light peaks and transformation into positional information according to an embodiment of the invention.
Figure 4B:
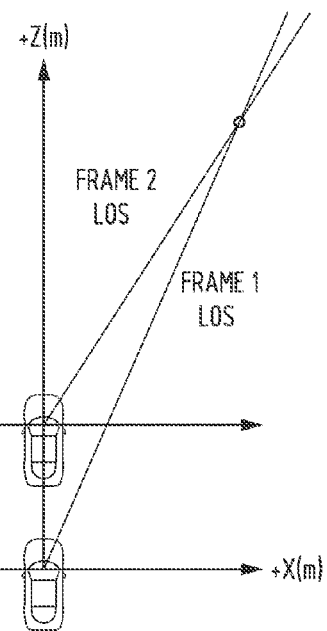

FIG. 4A and FIG. 4B are diagrams showing various examples of the feature extraction process where FIG. 4A shows images with the presence of roadway markers or signs a predetermined distance from the vehicle on both the left and right sides of the roadway. FIG. 4B illustrates a top or birds-eye view of that shown in FIG. 4A, using signs or images on both sides of the roadway where their distance (X) from the vehicle path (Z) is identified to insure these are preferred light peaks. By way of example, FIGS. 4A and 4B both show how a light peak is identified as a roadway marker and its global position is then identified in relation to the vehicle. Thus, FIG. 4B illustrates identification of the roadway markers at their specific locations on both sides of the vehicle over a plurality of frames e.g. frame 1 and frame 2 etc. These figures both illustrate examples of how found light peaks are assigned world positions relative to the vehicle. As a light point is tracked from one frame to another (frame 1, frame 2 etc.) the vehicles motion is known and a light point's position can then be triangulated. As described herein, this data is essential to calculating overall road width.

Referring again to FIG. 2, the step of utilizing vehicle motion uses the measured parameters from vehicle communication including but not limited to speed and yaw data from sources other than the camera or imager. Feedback from the vehicle indicating the low beam or high beam state of the light sources is also an important parameter in classifying images into various types. The process continues where a road update model 211 is used along with the vehicle motion data 209 for determining the width of road upon which the vehicle is traveling. The road model 211 uses the light classification that includes various criteria including but not limited to 1) positioning of the light source; 2) vehicle motion; 3) use of road edge signs; 4) currently calculated vehicle position and/or 5) classified light type. The light points are fit to the road model relative to the vehicle where the average lateral distance for the lights classified as road signs are used to update the models for the left and right edges of the road. The average lateral distance for lights classified as oncoming traffic are used to update the model for the oncoming traffic. The "strength" of the multiple models is then updated where a calculation is made based on the average variance for each of the different models. Once the multiple road models reach a threshold level or "strength" indicating a level of certainty in the current model, it can then be used as an input for other system features so that this information such as lane and roadway details can benefit other driver assist systems including but not limited to headlight control, headlight beam pattern adjustment, LDW, blind spot detection, false positive rejection of headlights and taillights, vehicle object tracking lists or the like. Finally, a check is made for reinitializing conditions where certain conditions like low speed and high yaw can cause the road model to return to default values.

Figure 5:
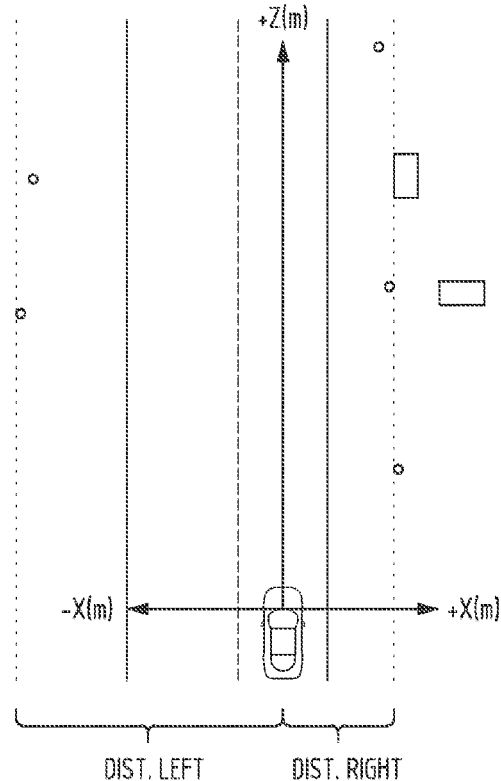
FIG. 5 is a diagram showing how a vehicle can determine roadway width in accordance with an embodiment of the invention.

FIG. 5 is a diagram illustrating a vehicle that has a determined roadway width in accordance with an embodiment of the invention where the left distance from the road (−X(m) and right distance to the right side of the road (+X(m) are calculated to determine the position of the vehicle in the roadway. Thus, in this example the vehicle is in the right lane to the right of the dashed centerline traveling in the +Z(m) direction.

Once the road model is updated 211, the information can be used to determine the width of motorway 213, oncoming or direction of travel lane position 215 or other input data 217 including but not limited to a vehicle object tracking list used to quickly identify various types of light sources surrounding a vehicle. For purposes of this description, those skilled in the art will recognize that the term "oncoming" means but is not limited to coming nearer in space, time and/or approaching a point. The optical position of the light points that have been classified as either "oncoming" or "preceding" vehicles can be projected onto the road width models. This projection is to aid in determining if the positions of the light peaks are consistent or if they have been found to contradict with the road models. If the light peaks contradict with the road model they may have been incorrectly classified or have an incorrect global position. Once roadway width had been determined, the motorway identification 213 operates by comparing the lateral distance of the oncoming traffic model to known experimental results. Alternatively, the ratio of the oncoming traffic model can be compared to the road left edge model for identifying the motorway. The identification of lane position for oncoming lanes or those lanes of traffic in the direction travel as well as lane position 215 may be used to give an indication as which roadway lane the vehicle using the system of the invention is positioned. At least one method of the invention includes the steps of comparing the distance to the road right edge model to an estimated lane position that accounts for "nominal" road shoulder size and lane width. Alternatively, this lane position can also be determined by comparing the distance to the road left edge model to an estimated lane position that accounts for nominal shoulder size and lane width. A lane position from the left and a lane position from the right may not always be determinable based on valid and consistent markers and signs on the sides of the roadway. This information is used by decision logic 221 as well as other vehicular inputs 219 for determining the function and operation of various systems on the vehicle.

Thus, various embodiments of the present invention are directed to a vehicular imagining system used for identifying the width of a roadway that includes an imager for capturing images to the sides of vehicle and one or more imaging processors that are used for identifying roadway edge signs in captured images. The process determines a physical distance from a roadway edge sign to the left of the vehicle and a roadway edge sign to the right of the vehicle for identifying the roadway width that can be used in various electronic and telematics systems for enhancing vehicle operation and safety.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A vehicular imaging system for determining roadway width comprising:
   an image sensor configured for capturing images;
   an image processor configured for receiving captured images;
   wherein the image sensor configured to view forward of a vehicle, such that a field of view of the image sensor includes the roadway and roadway marker signs on both the right side and left side of the roadway;
   wherein the image processor is configured to determine roadway width by identifying roadway marker signs in processed images that are captured by the image sensor and determine a distance from the roadway marker signs;
   wherein the processor is further configured to use the road width for controlling a driver assist function on the vehicle;
   wherein the driver assist function is at least one of a headlamp control function, a traffic sign recognition (TSR) function, and a lane departure warning (LDW) function; and
   wherein the image processor is one of an application specific integrated circuit (ASIC) and a field programmable gate array (FPGA).

2. A vehicular imaging system as in claim 1, wherein the image processor is further configured to identify peaks in the captured image that are associated with the roadway marker signs.

3. A vehicular imaging system as in claim 1, wherein the roadway width is determined by calculating a distance from at least one roadway marker sign to a known vehicle location.

4. A vehicular imaging system in claim 1, wherein the roadway width is determined using a position identified as at least one of a left roadway edge and a right roadway edge.

5. A vehicular imaging system as in claim 1, wherein the image processor is configured to create a road width model for identifying the number of lanes in the road way.

6. A vehicular imaging system as in claim 1, wherein the image processor is configured to use a road width model for identifying the position of the vehicle on the roadway.

7. A vehicular imaging system as in claim 1, wherein a roadway edge sign is tracked over a plurality of frames for triangulating its position in relation to a known location of the vehicle.

8. A vehicular imaging system as in claim 1, wherein the processor is further configured to track at least one oncoming vehicle to determine the position of oncoming roadway lanes.

9. An optical imagining system used for identifying the width of a vehicular roadway comprising:
   at least one imager configured to capture images;
   at least one imaging processor configured to receive images captured from the at least one imager for identifying roadway edge signs in the captured images;
   wherein the at least one imager is configured to view forward of a vehicle, such that a field of view of the at least one imager includes the roadway and roadway marker signs on both the right side and left side of the roadway;
   wherein the at least one processor is configured to determine a distance from a roadway edge sign for identifying the size and width of the roadway;
   wherein the processor is further configured to use the road width for controlling a driver assist function on the vehicle;
   wherein the driver assist function comprises a headlamp control function, a traffic sign recognition (TSR) function, and a lane departure warning (LDW) function; and wherein the image processor is a field programmable gate array (FPGA).

10. An optical imaging system as in claim 9, wherein the at least one image processor is configured to determine the position of the vehicle on the roadway.

11. An optical imaging system in claim 9, wherein the roadway width is determined using a position identified as a left roadway edge.

12. An optical imaging system as in claim 9, wherein the image processor is configured to create a road width model for identifying the number of lanes in the road way.

13. An optical imaging system as in claim 9, wherein at least one oncoming vehicle light is tracked to determine the position of oncoming roadway lanes.

* * * * *